US012725162B2

(12) United States Patent
Bondoux et al.

(10) Patent No.: US 12,725,162 B2
(45) Date of Patent: Sep. 1, 2026

(54) TECHNIQUES FOR HANDLING CARD TESTING ATTACKS

(71) Applicant: STRIPE, LLC, South San Francisco, CA (US)

(72) Inventors: Alexandre Bondoux, Seattle, WA (US); Elaine Cheng, Mercer Island, WA (US)

(73) Assignee: Stripe, LLC, South San Francisco, CA (US)

( * ) Notice: Subject to any disclaimer, the term of this patent is extended or adjusted under 35 U.S.C. 154(b) by 154 days.

(21) Appl. No.: 18/506,629

(22) Filed: Nov. 10, 2023

(65) Prior Publication Data

US 2025/0156870 A1 May 15, 2025

(51) Int. Cl.
*G06Q 20/40* (2012.01)

(52) U.S. Cl.
CPC ................................ *G06Q 20/4016* (2013.01)

(58) Field of Classification Search
CPC .................................................. G06Q 20/4016
See application file for complete search history.

(56) References Cited

U.S. PATENT DOCUMENTS 11,205,179 B1 * 12/2021 Patel .................. G06Q 20/4016

OTHER PUBLICATIONS

Anonymous, "Neural network (machine learning)", Wikipedia, Jun. 1, 2023, 37 pages.
International Search Report and Written Opinion received for PCT Patent Application No. PCT/US24/55106, mailed on Mar. 20, 2025, 11 pages.

* cited by examiner

*Primary Examiner* — Ojo O Oyebisi
(74) *Attorney, Agent, or Firm* — Finnegan, Henderson, Farabow, Garrett & Dunner, LLP

(57) ABSTRACT

Embodiments may include receiving a request including transaction data to evaluate a transaction as part of a charge path that processes at least a portion of the transaction; processing, by a set of blocking machine learning models, a portion of the transaction data to generate a set of blocking scores for the transaction; retrieving, from a memory, a set of card testing attack (CTA) scores associated with the transaction, the set of CTA scores indicative of an occurrence of a card testing attack, and the set of CTA scores retrieved based on the transaction data; adjusting a set of default blocking score thresholds based on the set of CTA scores to generate a set of adjusted blocking score thresholds; and determining to allow the transaction based on comparison of the set of blocking scores with the set of adjusted blocking score thresholds.

19 Claims, 10 Drawing Sheets

TRANSACTION DATA 304

BLOCKING MANAGER 320

BLOCKING DECISION 322

MODEL 310a

MODEL 310b

MODEL 310c

MODEL SET 308

CHARGE BLOCKING (CB) MODEL MANAGER 306

SCORE 312a

SCORE 312b

SCORE 312c

BLOCKING SCORE SET 302

SCORE 318a

SCORE 318b

SCORE 318c

CTA SCORE SET 316

MEMORY 314

800

RECEIVING, BY A SERVER SYSTEM, A REQUEST TO EVALUATE A TRANSACTION AS PART OF A CHARGE PATH CORRESPONDING TO THE TRANSACTION, WHEREIN THE REQUEST INCLUDES TRANSACTION DATA ASSOCIATED WITH THE TRANSACTION
802

PROCESSING, BY A SET OF BLOCKING MACHINE LEARNING (ML) MODELS OF THE SERVER SYSTEM, A PORTION OF THE TRANSACTION DATA TO GENERATE A SET OF BLOCKING SCORES FOR THE TRANSACTION
804

RETRIEVING, BY THE SERVER SYSTEM FROM A MEMORY, A SET OF CARD TESTING ATTACK (CTA) SCORES ASSOCIATED WITH THE TRANSACTION, THE SET OF CTA SCORES INDICATIVE OF AN OCCURRENCE OF A CARD TESTING ATTACK, AND THE SET OF CTA SCORES RETRIEVED BASED ON THE TRANSACTION DATA
806

ADJUSTING, BY THE SERVER SYSTEM, A SET OF DEFAULT BLOCKING SCORE THRESHOLDS BASED ON THE SET OF CTA SCORES TO GENERATE A SET OF ADJUSTED BLOCKING SCORE THRESHOLDS
808

COMPARING, BY THE SERVER SYSTEM, THE SET OF BLOCKING SCORES WITH THE SET OF ADJUSTED BLOCKING SCORE THRESHOLDS
810

DETERMINING, BY THE SERVER SYSTEM, TO ALLOW THE TRANSACTION BASED ON COMPARISON OF THE SET OF BLOCKING SCORES WITH THE SET OF ADJUSTED BLOCKING SCORE THRESHOLDS
812

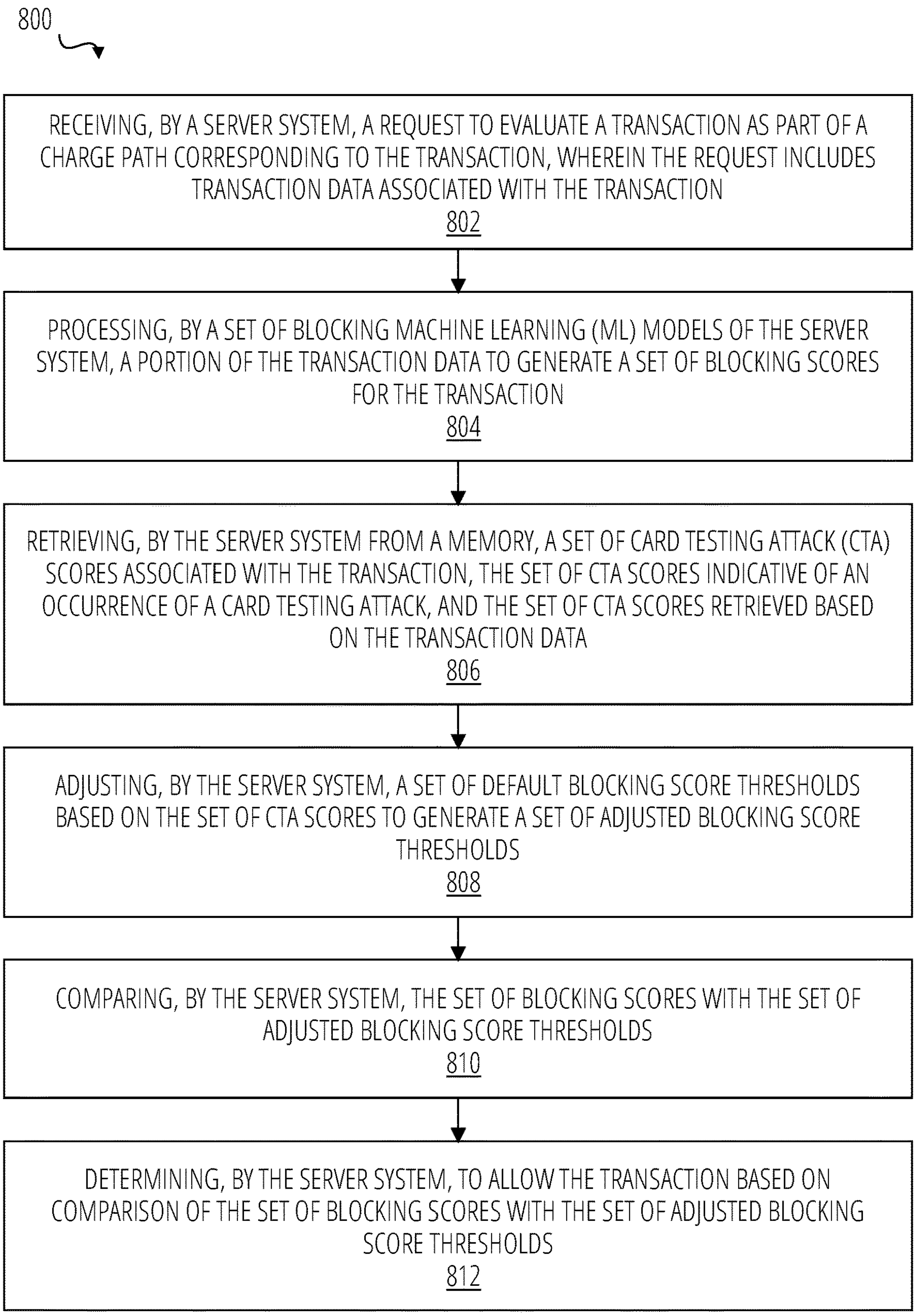

FIG. 8

TECHNIQUES FOR HANDLING CARD TESTING ATTACKS

FIELD OF DISCLOSURE

This disclosure is related generally to handling card testing attacks (CTAs) in financial processing systems and more particularly to techniques for detecting and/or blocking CTAs.

BACKGROUND

Merchants, such as grocers, car services, dry cleaning services, online marketplaces, etc., provide their products and services to consumers. Such merchants may employ agents to deliver their products and/or provide the actual services to the merchant's customers. For example, a person acting on the merchant's behalf will drive a consumer in their own car, deliver food ordered through a merchant website, pick up and/or drop off clothes dry cleaned by the merchant, etc.

These merchants, although providing systems for supplying products and/or services to consumers, often do not perform the financial processing associated with the merchant transactions. Instead, merchants utilize commerce systems to process financial transactions for the products and/or services provided to consumers. This may include the merchant, agent, and other users establishing accounts with the commerce system. Once the accounts are established, merchants can run financial transactions using the services of the commerce system, merchant agents can accept payments from customers on behalf of the merchant for provided products and/or services, and the commerce system can process the payments, performs payouts for services rendered, as well as other financial processing services. This processing of payments by the commerce platform may include running credit cards, crediting a merchant account for the transaction, crediting the agent responsible for the transaction, debiting a commerce system fee for processing the transaction on behalf of the merchant, interacting with authorization network systems (e.g., bank systems, credit card issuing systems, etc.), as well as performing other commerce related transactions for the merchant and/or agent such as providing payouts for products/services rendered on behalf of a merchant.

Financial processing systems can be subjected to numerous types of fraudulent activity, such as card testing attacks (CTAs). Card testing is a type of fraudulent activity where someone tries to determine whether stolen card information is valid so that they can use it to make purchases. A fraudster may do this by purchasing stolen credit card information, and then attempting to validate or make purchases with those cards to determine which cards are still valid. In some scenarios, the stolen card information may be incomplete (e.g., includes the first 6 or 8 digits and/or the last 4 digits). In such scenarios, the fraudster may try to guess the missing information and then attempt to validate or make purchases using the guessed values with the stolen information. Other common terms for card testing include "carding", "account testing", "an enumeration attack", and "card checking."

BRIEF SUMMARY

Processes, apparatuses, machines, and articles of manufacture for detecting and blocking card testing attacks are described. It will be appreciated that the embodiments may be combined in any number of ways without departing from the scope of this disclosure.

Example methods, such as computer-implemented methods for handling card testing attacks, are described herein. An example method include receiving, by a server system, a request to evaluate a transaction as part of a charge path that processes at least a portion of the transaction, wherein the request includes transaction data associated with the transaction; processing, by a set of blocking machine learning (ML) models of the server system, a portion of the transaction data to generate a set of blocking scores for the transaction; retrieving, by the server system from a memory, a set of card testing attack (CTA) scores associated with the transaction, the set of CTA scores indicative of an occurrence of a card testing attack, and the set of CTA scores retrieved based on the transaction data; adjusting, by the server system, a set of default blocking score thresholds based on the set of CTA scores to generate a set of adjusted blocking score thresholds; comparing, by the server system, the set of blocking scores with the set of adjusted blocking score thresholds; and determining, by the server system, to allow the transaction based on comparison of the set of blocking scores with the set of adjusted blocking score thresholds.

Example non-transitory computer-readable media are disclosed herein. An example non-transitory computer-readable storage medium includes instructions that, when executed by a processor, cause the processor to perform operations for handling card testing attacks, the operations comprising: receiving, by a server system, a request to evaluate a transaction as part of a charge path that processes at least a portion of the transaction, wherein the request includes transaction data associated with the transaction; processing, by a set of blocking machine learning (ML) models of the server system, a portion of the transaction data to generate a set of blocking scores for the transaction; retrieving, by the server system from a memory, a set of card testing attack (CTA) scores associated with the transaction, the set of CTA scores indicative of an occurrence of a card testing attack, and the set of CTA scores retrieved based on the transaction data; adjusting, by the server system, a set of default blocking score thresholds based on the set of CTA scores to generate a set of adjusted blocking score thresholds; comparing, by the server system, the set of blocking scores with the set of adjusted blocking score thresholds; and determining, by the server system, to allow the transaction based on comparison of the set of blocking scores with the set of adjusted blocking score thresholds.

Example server computer systems are disclosed herein. An example server computer system for handling card testing attacks comprises a memory and a processor coupled to the memory configured to: receive, by a server system, a request to evaluate a transaction as part of a charge path that processes at least a portion of the transaction, wherein the request includes transaction data associated with the transaction; process, by a set of blocking machine learning (ML) models of the server system, a portion of the transaction data to generate a set of blocking scores for the transaction; retrieve, by the server system from a memory, a set of card testing attack (CTA) scores associated with the transaction, the set of CTA scores indicative of an occurrence of a card testing attack, and the set of CTA scores retrieved based on the transaction data; adjust, by the server system, a set of default blocking score thresholds based on the set of CTA scores to generate a set of adjusted blocking score thresholds; compare, by the server system, the set of blocking scores with the set of adjusted blocking score thresholds; and determine, by the server system, to allow the transaction based on comparison of the set of blocking scores with the set of adjusted blocking score thresholds.

Selectively blocking transactions in this manner allows for scores to be retrieved, adjusted, and/or compared without introducing computationally demanding steps into the charge path of a transaction. In turn, this allows for efficient and reliable management of transactional behaviors without introducing unwanted delays, complexity, and latency into the charge path itself.

Other processes, machines, and articles of manufacture are also described herein, which may be combined in any number of ways, such as with the embodiments of the brief summary, without departing from the scope of this disclosure.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

To easily identify the discussion of any particular element or act, the most significant digit or digits in a reference number refer to the figure number in which that element is first introduced.

FIG. 8 illustrates a logic flow of an exemplary method for CTA handling according to some embodiments.

DETAILED DESCRIPTION

Figure 1:
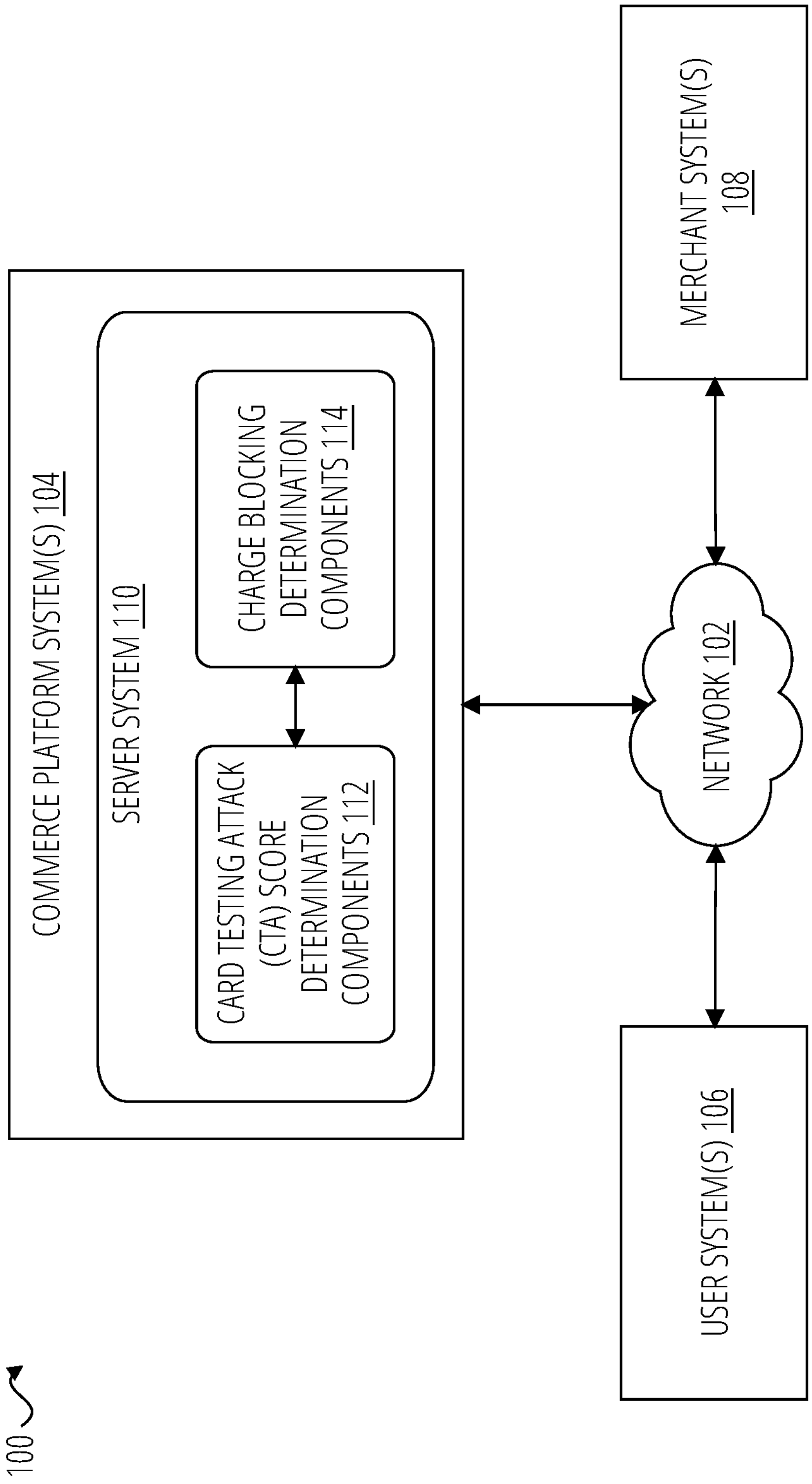
FIG. 1 is a block diagram of an exemplary system architecture for detecting card testing attacks (CTAs) according to some embodiments.

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "processing", "retrieving", "adjusting", "comparing", "determining", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

Generally, this disclosure describes techniques for handling card testing attacks (CTAs). More specifically, embodiments are directed to a server system for detecting and blocking CTAs. For example, embodiments may include components that detect CTAs using machine learning (ML) models and components that block transactions associated with CTAs based on the scores generated by the ML models. These and other embodiments are described and claimed.

Existing techniques for handling CTAs fail to provide the ability to quickly and efficiently handle CTAs. For example, existing system may identify a CTA in a manner that is not quick enough to block the CTA before it is over. In another example, existing systems may identify a CTA in a manner that introduces significant latency into transaction processing. In such examples, detection of CTAs may be part of a charge path that processes at least a portion of a transaction.

However, adding additional processes to a charge path slows down processing of transactions by introducing latency into the charge path. Adding further complexity, existing systems suffer from an inability to strike a balance between reliably detecting CTAs while limiting false positives. For example, existing systems may utilize high detection thresholds to reduce false positives at the expense of less reliable CTA detection. In another example, existing systems may utilize low detection thresholds to improve CTA detection rates at the expense of increased false positives. In yet another example, existing systems may rely on a single ML model to detect a broad range of CTA patterns, such as in an attempt to reduce latency. However, use of a single ML model to detect a broad range of CTA patterns results in unreliable CTA detection. These limitations can drastically reduce the usability and applicability of CTA handling systems, contributing to unacceptable latency, excessive vulnerabilities, and inefficient systems, devices, and techniques with limited capabilities.

Accordingly, many embodiments disclosed herein provide resource-efficient techniques to accurately detect and block CTAs without introducing excessive latency into the charge path. Various embodiments utilize CTA score determination components located outside of a charge path and charge blocking determination components located on the charge path of the transaction that make a blocking decision based on the available CTA scores. For example, the CTA score determination components may generate and populate a memory, such as a cache, with CTA scores that are generated for a transaction asynchronously with the charge path that processes the transaction. The CTA scores may then be utilized by charge blocking determination components to adjust thresholds for blocking transaction in the near future (e.g., transactions received within the next minute).

In these and other ways, components/techniques described herein provide many technical advantages. For instance, the computer-based techniques of the current disclosure improve the functioning of a server systems for transaction processing as compared to conventional approaches because the techniques enable CTA detection and blocking in a manner that reduces latency, accurately and reliably detects CTAs, dynamically adapts to detect CTAs without excessive false positives, and provides expanded capabilities versus conventional approaches. For example, CTA detection may occur outside of the charge path to avoid introducing latency into charge paths of transactions. In another example, a plurality of ML models may be utilized to detect CTAs, with each of the plurality of ML models being specifically trained to detect specific patterns associated with CTAs in an efficient, accurate, and reliable way. In yet another example, charge blocking thresholds may be dynamically adapted based on CTA detection scores to reliably detect CTAs without excessive false positives. Accordingly, embodiments disclosed herein can be practically utilized to improve the functioning of a computer and/or to improve a variety of technical fields including transaction processing, fraud detection, server systems, artificial intelligence, CTA detection, CTA blocking, and/or commerce platforms.

FIG. 1 is a block diagram of an exemplary system architecture for detecting card testing attacks (CTAs) according to some embodiments. In one embodiment, the system 100 includes one or more commerce platform systems 104, one or more merchant systems 108, and one or more user systems 106. In one embodiment, one or more systems (e.g., systems 106 and 108) may be mobile computing devices, such as a smartphone, tablet computer, smartwatch, etc., as well computer systems, such as a desktop computer system, laptop computer system, server computer systems, etc. The commerce platform systems 104 and merchant systems 108 may also be one or more computing devices, such as one or more server computer systems, desktop computer systems, etc. Furthermore, there may be any number of user systems 106 and/or merchant systems 108 utilizing the services of the commerce platform systems 104. However, to avoid obscuring the present description, only one commerce platform system 104, user system 106, and merchant system 108 are generally illustrated and described.

Furthermore, it should be appreciated that the techniques discussed herein may be utilized by a plurality of different types of systems, such as other commerce platform system(s) including payment processing systems, card authorization systems, banks, and other systems seeking to identify and detect fraud during transactions. Furthermore, any system seeking to reduce card testing attacks (CTAs) may use and/or extend the techniques discussed herein to detect and/or block card testing attacks. However, to avoid obscuring the techniques discussed herein, CTA handling (e.g., during network based transactions) is discussed to illustrate and describe the embodiments of the present invention, and is not intended to limit the application of the techniques described herein from implementation in other systems in which CTA handling (e.g., CTA detection and/or blocking) could be used.

The commerce platform system 104, merchant system 108, and user system 106 may be coupled to a network 102 and communicate with one another using any of the standard protocols for the exchange of information, including secure communication protocols. In one embodiment, one or more of the commerce platform system 104, merchant system 108, and user system 106 may run on one Local Area Network (LAN) and may be incorporated into the same physical or logical system, or different physical or logical systems. Alternatively, the commerce platform system 104, merchant system 108, and user system 106 may reside on different LANs, wide area networks, cellular telephone networks, etc. that may be coupled together via the Internet but separated by firewalls, routers, and/or other network devices. In one embodiment, commerce platform system 104 may reside on a single server, or be distributed among different servers, coupled to other devices via a public network (e.g., the Internet) or a private network (e.g., LAN). It should be noted that various other network configurations can be used including, for example, hosted configurations, distributed configurations, centralized configurations, etc.

In one embodiment, commerce platform system 104 provides financial processing services to one or more merchants, such as to merchant system 108 and/or user system 106 that act as an agent of merchant system 108. For example, commerce platform system 104 may manage merchant accounts held at the commerce platform, run financial transactions from user system 106 performed on behalf of a merchant, clear transactions, performing payouts to merchant and/or merchant agents, manage merchant and/or agent accounts held at the commerce platform system 104, as well as other services typically associated with commerce platforms systems such as, for example, STRIPE™. In several embodiments, the commerce platform system 104 may utilize a charge path to perform one or more portions of a process for processing a transaction.

To prevent fraudulent transactions, in embodiments, commerce platform system(s) 110 utilizes a server system 110 including one or more charge blocking determination components 114 and one or more CTA score determination components 112. As will be discussed in greater detail below, the CTA score determination components 112 may generate scores that indicate the likelihood that a CTA is occurring and the charge blocking determination components 114 may adjust blocking thresholds and/or make blocking decisions based on the CTA scores. In some examples, the CTA score determination components 112 and the charge blocking determination components 114 operate substantially independently from each other. Thus, one or more embodiments described herein generally decouple detection of a CTA (as performed by CTA score determination components 112) and blocking transactions (as performed by charge blocking determination components 114), such as in response to determining a CTA is occurring, to provide improved handling of CTAs.

Figure 2:
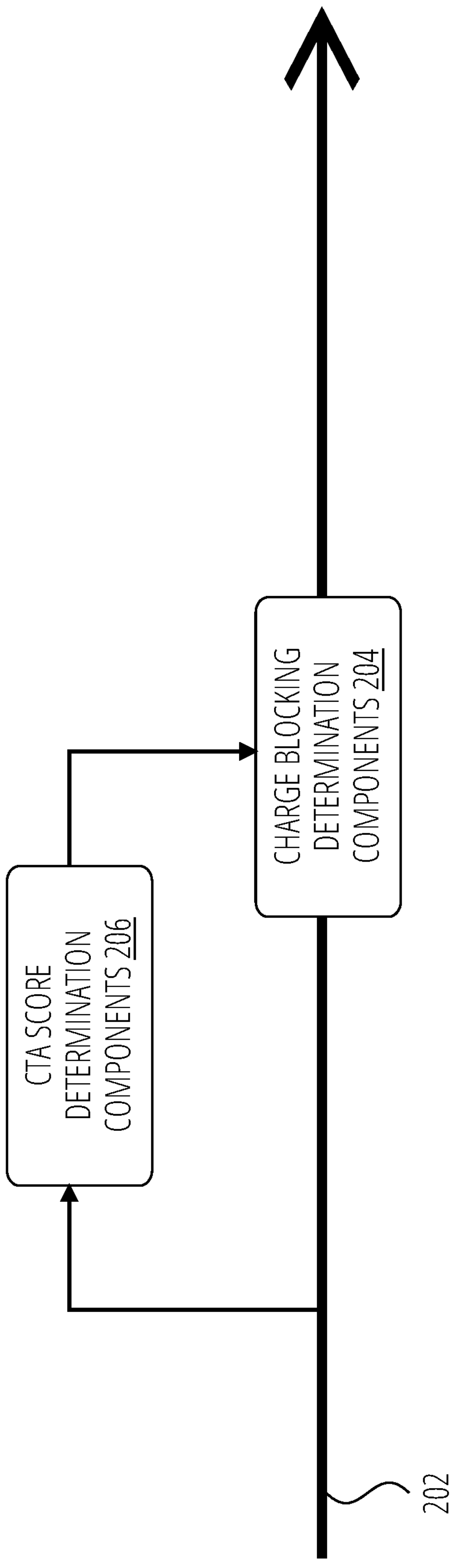
FIG. 2 illustrates various aspects of CTA handling in conjunction with a charge path according to some embodiments.

FIG. 2 illustrates various aspects of CTA handling in conjunction with a charge path 202 according to some embodiments. The illustrated embodiment includes the charge path 202, one or more CTA score determination components 206, and one or more charge blocking determination components 204. In various embodiments described herein, the charge blocking determination components 204 may be included in a charge path for processing at least a portion of a transaction while the CTA score determination components 206 may be external to (e.g., in parallel with) the charge path. More specifically, the CTA score determination components 206, while operating outside of the charge path, may generate scores that are indicative of whether or not a CTA is occurring, and the charge blocking determination components 204 may utilize scores generated by the CTA score determination components 206 to determine whether to block charges as part of the charge path 202. It will be appreciated that one or more components of FIG. 2 may be the same or similar to one or more other components disclosed herein. For example, charge blocking determination components 204 may be the same or similar to CTA score charge blocking determination components 114. In another example, CTA score determination components 206 may be the same or similar to charge blocking CTA score determination components 112. Further, aspects discussed with respect to various components in FIG. 2 may be implemented by one or more other components from one or more other embodiments without departing from the scope of this disclosure. Embodiments are not limited in this context.

The charge path 202 may include a series of operations performed by a commerce platform to process a transaction, or at least a portion thereof. Generally, each operation in the charge path 202 must be performed in order to process the transaction, and thus each operation in the charge path 202 adds at least some latency to processing the transaction. Accordingly, having as few and as efficient operations as possible in the charge path 202 reduces latency associated with transaction processing. However, operations must be a part of the charge path 202 to directly affect processing of the transaction. For example, in order to block a transaction associated with fraudulent activity (e.g., CTAs), a process that forms a part of the charge path 202 must be utilized. Therefore, many embodiments described herein handle CTAs using as few components as possible that form part of the charge path 202.

In many embodiments, the CTA score determination components 206 may generate scores indicative of whether or not a CTA is occurring, and charge blocking determination components 204 may utilize the scores to determine whether or not to block a transaction as part of the charge path 202. For example, CTA score determination components 206 may generate and populate a memory, such as a cache, with CTA scores that are generated for a transaction asynchronously with the charge path 202 that processes the transaction. The CTA scores may then be utilized by charge blocking (CB) determination components to adjust thresholds for blocking transactions in the future (e.g., transactions received within the next minute). In other words, CTA scores generated based on a previous transaction associated with an entity may be utilized in determining whether to block a current or future transaction associated with the entity.

As previously discussed, CTAs are a type of fraudulent activity where someone tries to determine whether stolen card information is valid so that they can use it to make purchases. Typically, a CTA attempts to test information for a plurality of stolen cards. Advantageously, the CTA handling techniques described herein leverage this fact to generate CTA scores indicative of a CTA and utilize those scores to adjust CTA blocking logic of the charge blocking determination components 204 to an appropriate sensitivity. For example, default thresholds may be utilized when the scores indicate little or no risk of a CTA occurring, and more sensitive thresholds may be utilized when the scores indicate a considerable risk of being under a CTA. In many embodiments, the default thresholds may be selected in a manner that can block fraudulent transactions, but keep false positives manageable during normal operation. However, when the scores indicate there is a considerable risk of a CTA occurring, the thresholds may be decreased for a period of time (e.g., one minute) to improve blocking of transactions corresponding to a CTA. In other words, as soon as the system detects one transaction that is indicative of a CTA, the system is dynamically adjusted to be more sensitive to blocking further transactions of the CTA. For example, thresholds for ML models designed to block fraudulent transactions can be reduced to increase the rate at which the CTA transactions are blocked. The specific functions, operations, and logic implemented by the charge blocking determination components 204 and the CTA score determination components 206 are described in more detail below.

Figure 3:
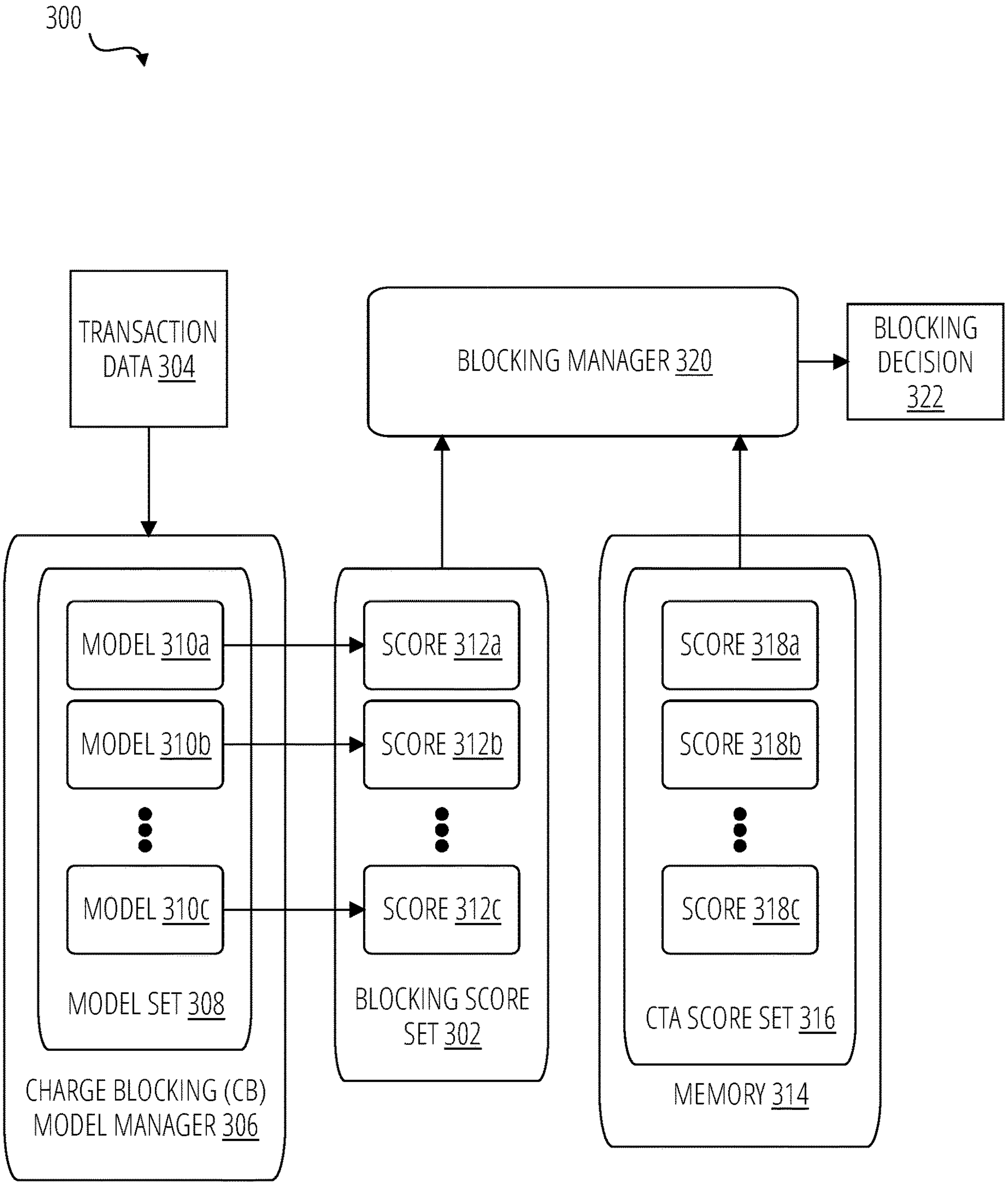
FIG. 3 illustrates various aspects of generating a blocking decision with a server system according to some embodiments.

FIG. 3 illustrates various aspects of generating a blocking decision 322 with a server system 300 according to some embodiments. In the illustrated embodiment, server system 300 includes transaction data 304, charge blocking model manager 306, a blocking score set 302, a memory 314 with a CTA score set 316, a blocking manager 320, and blocking decision 322. The transaction data 304 may comprise identifying information that identifies a merchant, a merchant bin, a bank, a bank bin associated with the transaction, or any combination thereof. The charge blocking model manager 306 includes a model set 308 with one or more models 310*a*, 310*b*, 310*c* (collectively referred to as models 310). The blocking score set 302 includes one or more scores 312*a*, 312*b*, 312*c* (collectively referred to as scores 312) generated by the models 310. The CTA score set 316 includes one or more scores 318*a*, 318*b*, 318*c* (collectively referred to as scores 318). As described in more detail below, the components of server system 300 may generate blocking decision 322 for a transaction associated with transaction data 304, based, for instance, on blocking score set 302 and/or CTA score set 316. It will be appreciated that one or more components of FIG. 3 may be the same or similar to one or more other components disclosed herein. For example, charge blocking model manager 306 and/or blocking manager 320 may be included as one of the charge blocking determination components 204 discussed with respect to FIG. 2. Further, aspects discussed with respect to various components in FIG. 3 may be implemented by one or more other components from one or more other embodiments without departing from the scope of this disclosure. Embodiments are not limited in this context.

Generally, the charge blocking model manager 306 generates blocking score set 302 with model set 308 based on the transaction data 304. The blocking manager 320 may then generate blocking decision 322 based on the blocking score set 302 and/or the CTA score set 316. For example, when one or more of the scores 312 in blocking score set 302 exceed a threshold, blocking manager 320 may determine to block the transaction. Further, when the CTA score set 316 indicates a CTA, blocking manager 320 may lower thresholds for the scores 312 in blocking score set 302 to cause the server system 300 to block transactions with lower scores 312. In various embodiments, generation of the blocking score set 302 by the model set 308 of charge blocking model manager 306 and generation of the blocking decision 322 by blocking manager 320 may occur as part of a charge path for processing at least a portion of the transaction corresponding to transaction data 304. In other embodiments, at least one of the blocking score set 302 or blocking decision 322 are generated and/or implemented outside of the charge patch.

The model set 308 of charge blocking model manager 306 may include one or more ML models that generate scores 310 based on transaction data 304 corresponding to a transaction. For example, transaction data 304 may include one or more of card information, transaction identifier, merchant identifier, a bank identifier, a bin identifier (e.g., merchant bin identifier or bank bin identifier), bank identifier, an internet protocol (IP) address, a country of origin, number of associated transactions, amount, merchant, name, application (e.g., web browser) used for transaction, type of API called, gateway responses (e.g., address, name, expiration, zip code, and similar verifications), behavioral signals (e.g., mouse movements, device movements, purchase pattern, time on page, etc.), and the like. In some embodiments, one or more of the models may include, or be replaced with, a heuristic. The blocking manager 320 may determine whether or not to block a transaction by comparing the blocking score set 302 to one or more blocking score thresholds. On the other hand, the scores 318 in CTA score set 316 may indicate a likelihood of whether a CTA is occurring.

During normal operation (e.g., when the scores 318 in CTA score set 316 are not indicative of a CTA occurring), the blocking manager 320 may utilize a default set of blocking thresholds. The default set of blocking score thresholds may still result in a transaction being blocked (e.g., if the transaction is determined to be part of a CTA), however, the default set of blocking score thresholds may be configured to reduce the occurrence of false positives (e.g., blocking transactions that are not fraudulent) at the cost of potentially not detecting some transactions that are actually fraudulent. However, when the scores 318 in CTA score set 316 indicate that a CTA attack is occurring, the blocking manager 320 may dynamically reconfigure itself to use a set of adjusted blocking score thresholds. The set of adjusted blocking score thresholds may be configured to reliably block transactions occurring as part of a CTA. In many embodiments, the adjusted thresholds may be on one or more of a per model basis, a per transaction type (e.g., charge or validation) basis, a per BIN (i.e., the first 6-8 digits of the card) basis, per transaction amount basis, and the like.

In various embodiments, each time the blocking manager 320 receives a transaction for processing as part of the charge path, it by query the memory 314 to attempt to acquire CTA scores that are relevant to the transaction (e.g., scores that correspond to the merchant associated with the transaction and have been generated within a threshold amount of time). When relevant CTA scores are available, the blocking manager 320 may utilize them to determine whether, and potentially how much, to adjust the blocking score thresholds. When the blocking score thresholds are adjusted in response to the CTA score set 316 indicating occurrence of a CTA, the adjusted block score thresholds may be utilized for a threshold amount of time (e.g., one minute or other set amount of time configurable by an operator of the blocking manager 320), after which the blocking score thresholds may be reset to the threshold values.

In various embodiments, if relevant CTA scores are not available, the blocking manager 320 may continue without adjusting the blocking score thresholds (e.g., fail open). In some embodiments, the memory 314 may comprise a cache memory, such as a distributed cache. Thus, if there is a cache hit (e.g., it may be determined whether a CTA score set associated with the transaction is in memory 314), the blocking manager 320 may determine whether or not to adjust the blocking score thresholds based on the scores 318 in CTA score set 316. However, if there is a cache miss, the blocking manager 320 may continue operation with the current blocking score thresholds. Generation of the scores 318 in CTA score set 316 and storing of the CTA score set 316 in memory 314 will be described in more detail below. Additionally, operation of the components of server system 300 are described in more detail below, such as with respect to FIG. 7B.

Figure 4:
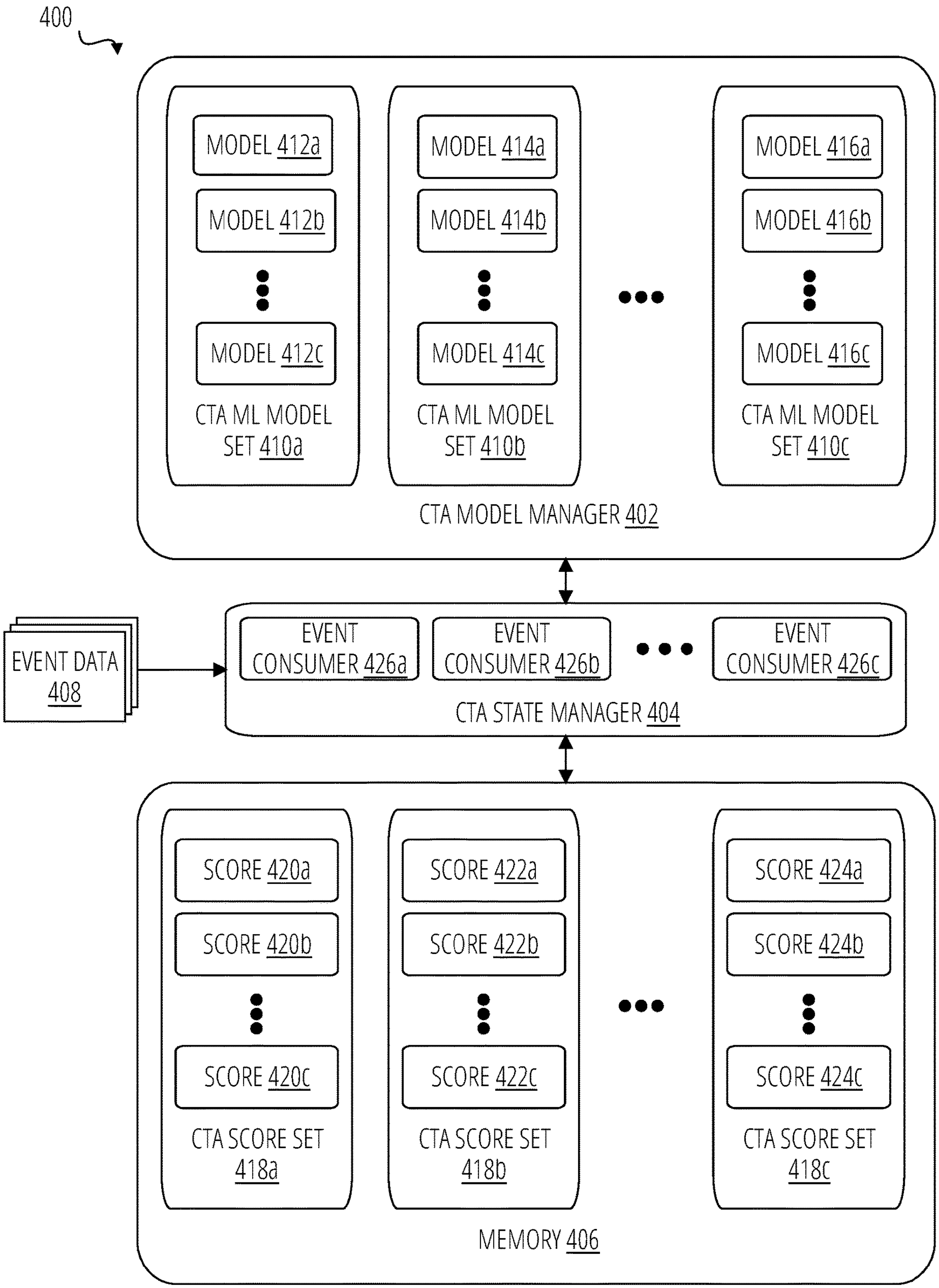
FIG. 4 illustrates various aspects of generating CTA score sets with a server system according to some embodiments.

FIG. 4 illustrates various aspects of generating CTA score sets with a server system 400 according to some embodiments. The components of server system 400 may operate to generate scores that are indicative of whether a CTA is occurring and make those scores available for use in making transaction blocking decisions. In the illustrated embodiment, server system 400 includes CTA model manager 402, CTA state manager 404, memory 406, and event data 408.

The CTA model manager 402 may include one or more CTA ML model sets 410*a*, 410*b*, 410*c* (collectively referred to as CTA ML model sets 410). CTA ML model set 410*a* may include one or more models 412*a*, 412*b*, 412*c* (collectively referred to as models 412), CTA ML model set 410*b* may include one or more models 414*a*, 414*b*, 414*c* (collectively referred to as models 414), and CTA ML model set 410*c* may include one or more models 416*a*, 416*b*, 416*c* (collectively referred to as models 416). The CTA state manager 404 may include one or more event consumers 426*a*, 426*b*, 426*c* (collectively referred to as event consumers 426).

The memory 406 may include one or more CTA score sets 418*a*, 418*b*, 418*c* (collectively referred to as CTA score sets 418). The CTA score set 418*a* may include one or more scores 420*a*, 420*b*, 420*c* (collectively referred to as scores 420), the CTA score set 418*b* may include one or more scores 422*a*, 422*b*, 422*c* (collectively referred to as scores 422), and CTA score set 418*c* may include one or more scores 424*a*, 424*b*, 424*c* (collectively referred to as scores 424). It will be appreciated that one or more components of FIG. 4 may be the same or similar to one or more other components described herein. For example, memory 406 may be the same or similar to memory 314. In another example, CTA model manager 402 and/or CTA state manager 404 may be included as one of the CTA score determination components 206. Further, aspects discussed with respect to various components in FIG. 4 may be implemented by one or more other components from one or more other embodiments without departing from the scope of this disclosure. For example, memory 406 may be included in charge blocking determination components 204 without departing from the scope of this disclosure. Embodiments are not limited in this context.

Generally, the CTA state manager 404 may receive event data 408 and provide it to the CTA model manager 402. The CTA model manager 402 may utilize the CTA ML model sets 410 to generate scores based on the event data 408 that are indicative of whether various fraudulent activities are occurring, such as fraudulent activities associated with CTAs. The scores may then be stored in memory 406 for use in making blocking decisions, such as determining whether or not to adjust blocking score thresholds.

In various embodiments, identification information (e.g., merchant identifier or bin identifier) in the event data 408 may be utilized to determine the appropriate event consumer. In many embodiments, the CTA state manager 404 may include a different event consumer for each CTA model set. When an event consumer receives event data, it may determine whether or not new scores have been generated by the corresponding CTA ML model set within a threshold amount of time. For example, the threshold period of time may be between 0.5 and 2 minutes, such as 0.8, 1, or 1.2 minutes. If new scores have not been generated within the threshold amount of time, the event consumer may trigger scoring by the corresponding CTA ML model set. However, if new scores have been generated within the threshold amount of time, the event consumer may place the event data in a queue until the threshold amount of time has elapsed.

In this manner, the CTA state manager 404 ensures that salient, up-to-date scores are available during operation, while mitigating the need to generate a new score each time an event consumer receives data. As a result, generation and usage of scores, and by extension, detection and management of CTA events, is made more efficient.

Each of the CTA ML models may be trained to identify a specific pattern that is indicative of a CTA or other fraudulent activity. For example, model 412*a* may be trained to identify patterns corresponding to whether a merchant is under attack, model 412*b* may be trained to identify patterns corresponding to whether a merchant is going to be rejected, and model 412*c* may be trained to identify patterns corresponding to whether the merchant has a security leak. The training may utilize gradient-boosted decision trees, deep learning architectures, supervised learning, and/or unsupervised learning. In many embodiments, tree based models, transformer based models, sequence models, or other featureless models may be utilized. Regarding deep learning, the models may include one or more of multi-layer perceptrons, residual neural networks, tab transformers, and the like. In one embodiment, a deep tabular data modeling architecture, such as tab transformers, may be utilized for supervised learning. In several embodiments, the features may be engineered to fit fraud.

The training data may come from, or be derived from, one or more of information on previous transaction (e.g., transaction data for prior transactions), expert review of transactions (which may be done in bulk or transaction by transaction), heuristics of known bad transactions, data obtained from nefarious groups (e.g., code snippets or compromised information), data from issuers, data from networks, data from users (e.g., merchants) that label transactions as fraudulent (e.g., card testing), data from regulators. For example, data may be obtained from circles on the dark web or telegram where code snippets or compromised data are retrieved from bad actors, which may then be labeled as fraudulent and used to train or retrain models.

In various embodiments, training specific models for detecting specific patterns may result in faster, more efficient, and more reliable detections of attacks. For example, running ten models in parallel with each model trained to detect one of ten patterns indicative of attack in parallel is more efficient and/or faster than running one model trained to detect all ten of the patterns indicative of attack. Additionally, specialized models for each pattern (or type of pattern) can be more accurate than a single more generalized model for detecting all of the patterns. Further, multiple models enables modifying parameters and/or retraining models for detecting certain patterns without having to modify parameters and/or retrain a more complicated model for detecting all of the patterns.

In some embodiments, each set of CTA ML models in CTA model manager 402 may correspond to different cardinalities. In various embodiments, the CTA model sets may correspond to one or more of merchant data, bank data, merchant bin data, or bank bin data. For example, CTA ML model set 410*a* may correspond to merchant level data and CTA ML model set 410*b* may correspond to bin level data. Each model in a CTA ML model set may utilize the same feature set. In some embodiments, a feature set may be generated based on the event data 408, such as by CTA state manager 404 or CTA model manager 402. In various embodiments, each of the ML models may be trained on the same data, but with different labels. In some embodiments, one or more of the models may include, or be replaced with, a heuristic.

The scores generated by the CTA ML model sets 414 may be stored in the memory 406, such as by CTA state manager 404. In some embodiments, the CTA state manager 404 may remove a CTA score set from the memory 406 when the CTA score set is over a threshold age. In various embodiments, each CTA score set may be associated with a time stamp, such as a time stamp indicating when the CTA score set was generated. Operation of the components of server system 400 are described in more detail below, such as with respect to FIG. 7B.

Figure 5:
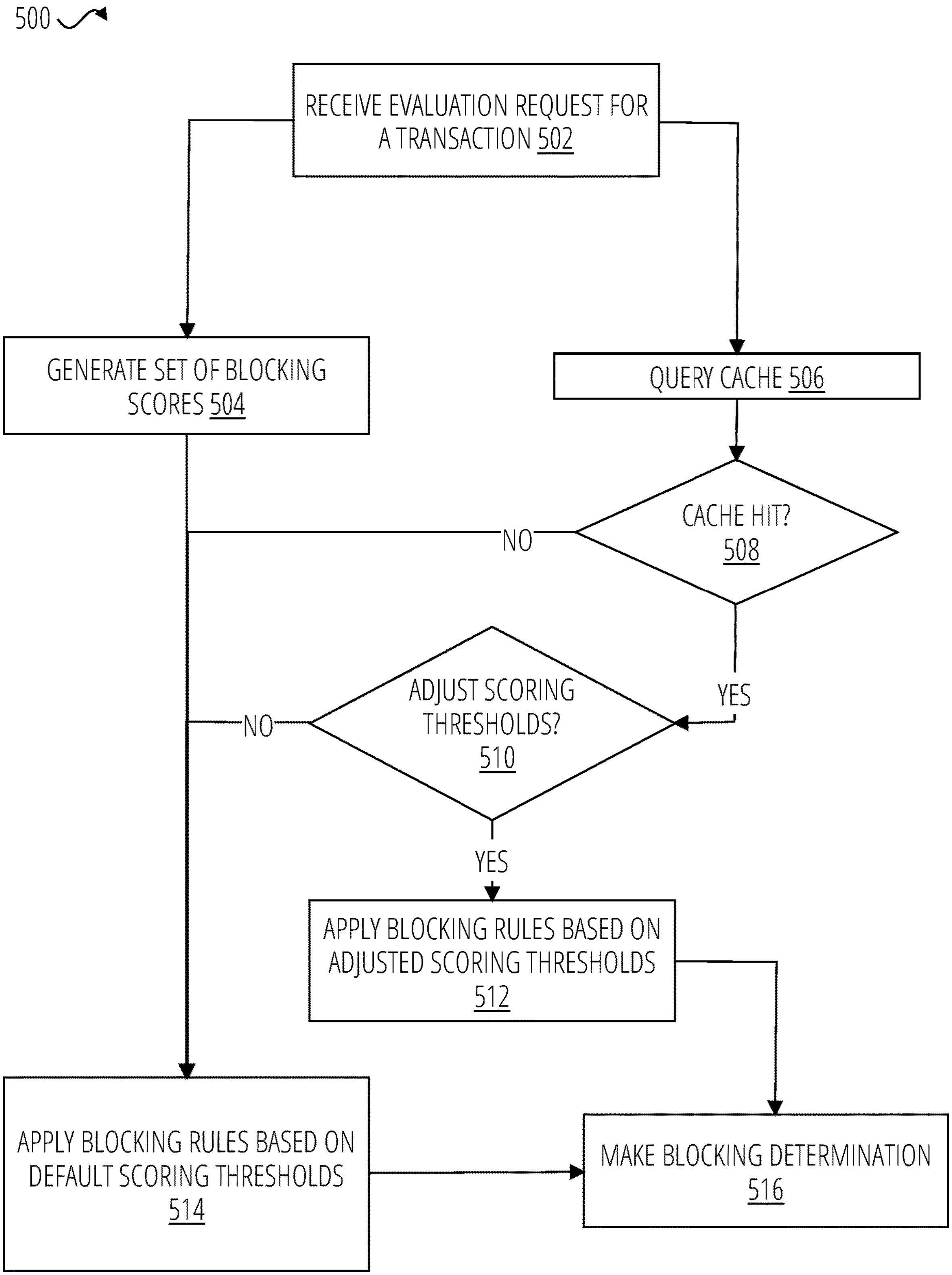
FIG. 5 illustrates a logic flow of a technique for making a blocking decision according to some embodiments.

FIG. 5 illustrates a logic flow 500 of a technique for making blocking decisions according to some embodiments. The logic flow 500 is performed by processing logic that may comprise hardware (circuitry, dedicated logic, etc.), software (such as is run on a general purpose computer system or a dedicated machine), firmware, or a combination thereof. In various embodiments, the logic flow 500 is performed by one or more of a commerce platform system (e.g., commerce platform system 104), a server system (e.g., server system 300 or server system 730) and charge blocking determination components (e.g., charge blocking determination components 114 or charge blocking determination components 204). Embodiments are not limited in this context.

Referring to FIG. 5, the logic flow 500 begins at block 502. At block 502, an evaluation request for a transaction may be received. In various embodiments, the evaluation request may include transaction data. In response to receiving the evaluation request, a set of blocking scores may be generated for the transaction at block 504 and a cache may be queried at block 506. For example, the model set 308 of charge blocking model manager 306 may be utilized to generate blocking score set 302 and blocking manager 320 may query memory 314 for scores associated with the transaction that are indicative of whether a CTA is occurring.

In many embodiments, retrieving scores in the manner can improve efficiency by minimizing operations included in the charge path.

Proceeding to decision block 508, it may be determined whether or not there was a cache hit for scores associated with the transaction. For example, it may be determined whether a CTA score set associated with the transaction is in memory 314. If there is not a cache hit, blocking rules may be applied at block 514 to the set of blocking scores generated at block 504 using default scoring thresholds at block 514. However, if there is a cache hit at decision block 508, it may be determined whether to adjust scoring thresholds at decision block 510. For example, blocking manager 320 may determine whether to adjust scoring thresholds. If it is determined to not adjust the scoring thresholds, the logic flow 500 may proceed to block 514 and continue as previously described. However, if it is determined to adjust the scoring thresholds at decision block 510, the logic flow 500 may proceed to block 512 where the blocking rules are applied based on the adjusted scoring thresholds. In various embodiments, being able to dynamically adjust the scoring thresholds provide the ability to automatically, quickly, and efficiently act against attacks as well as return to normal operation after the attack has subsided. At block 516 a blocking determination may be made based on application of the blocking rules. For example, blocking manager 320 may determine whether or not to block the transaction based on comparison of the blocking scores to either the default scoring thresholds or the adjusted scoring thresholds.

Figure 6:
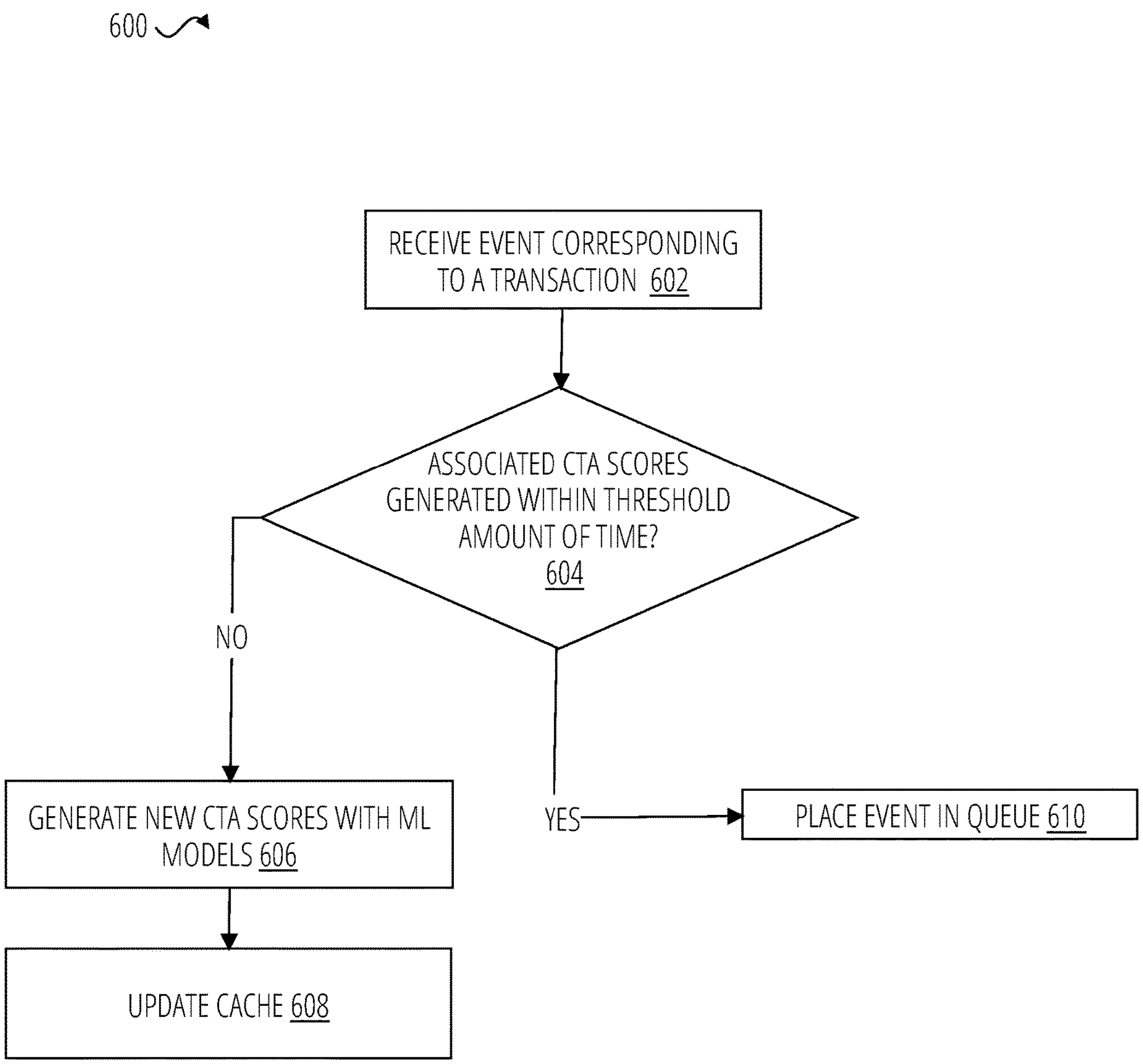
FIG. 6 illustrates a logic flow of a technique for populating a memory with CTA scores according to some embodiments.

FIG. 6 illustrates a logic flow 600 of a technique for populating a memory with CTA scores according to some embodiments. The logic flow 600 is performed by processing logic that may comprise hardware (circuitry, dedicated logic, etc.), software (such as is run on a general purpose computer system or a dedicated machine), firmware, or a combination. In various embodiments, the logic flow 600 is performed by one or more of a commerce platform system (e.g., commerce platform system 104), a server system (e.g., server system 400 or server system 730) and CTA score determination components (e.g., CTA score determination components 112 or CTA score determination components 206). Embodiments are not limited in this context.

Referring to FIG. 6, the logic flow 600 begins at block 602. At block 602, an event corresponding to a transaction may be generated. In response to receiving the event, it may be determined whether associated CTA scores have been generated within a threshold amount of time at decision block 604. For example, CTA state manager 404 may determine whether associated CTA scores have been generated within a threshold amount of time. If associated CTA scores have been generated within the threshold amount of time, the event may be placed in a queue at block 610. For example, event consumer 426*a* may place the event, or data from the event, in a queue.

However, if associated CTA scores have not been generated within the threshold amount of time, new CTA scores may be generated with ML models at block 606. For example, CTA model manager 402 may generate new CTA scores with CTA ML model set 410*a*. The new scores may then be utilized to update a cache at block 608. For example, CTA state manager 404 may update CTA score set 418*a* in memory 406 using the new scores. Updating scores using a threshold freshness can ensure relevant and indicative scores are utilized to determine whether to adjust thresholds with utilizing excessive resources, such as by updating scores with excessive frequency (e.g., in response to every transaction).

Figure 7A:
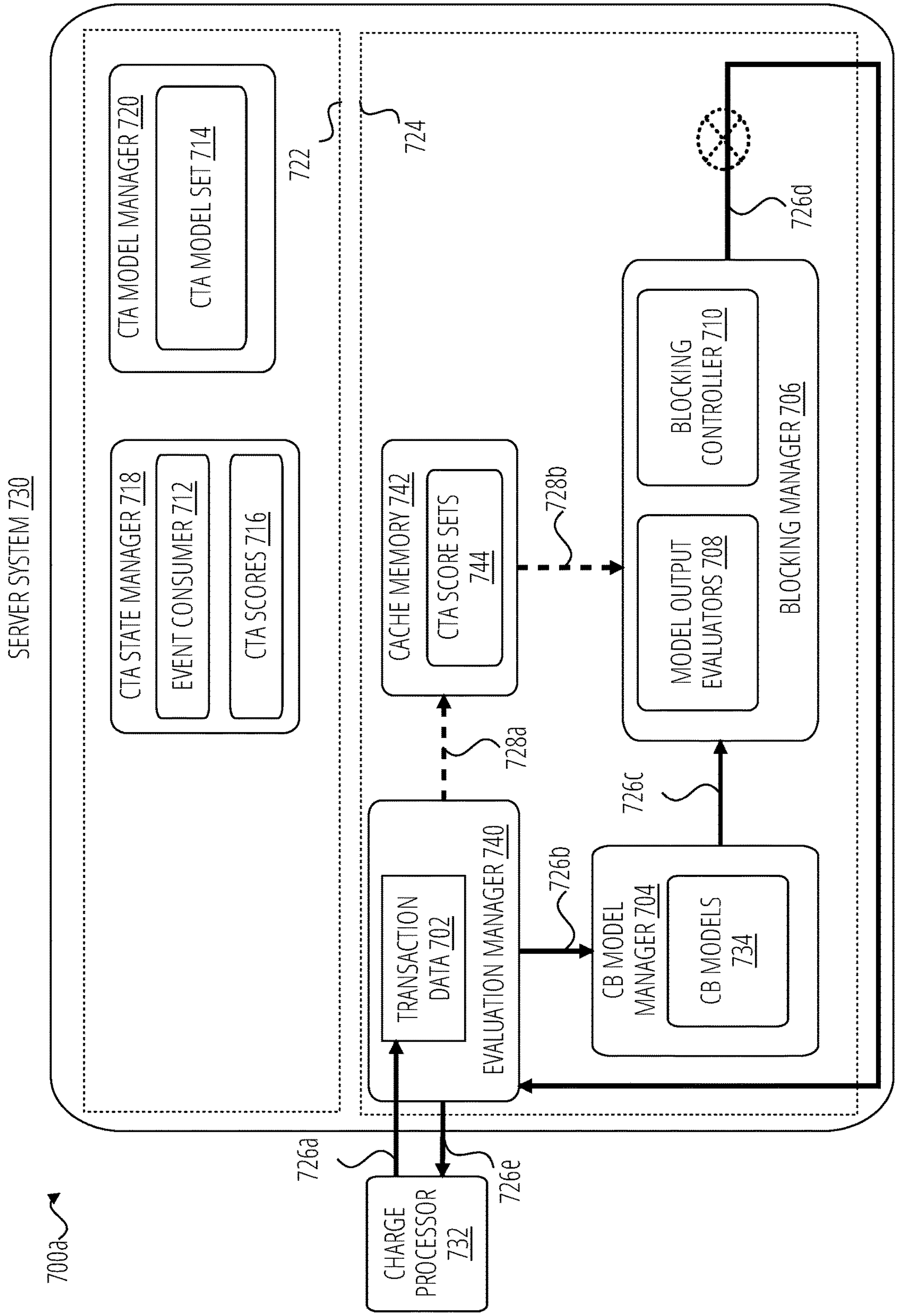
FIGS. 7A and 7B illustrate process flows for handling CTAs with a server system according to some embodiments.
Figure 7B:
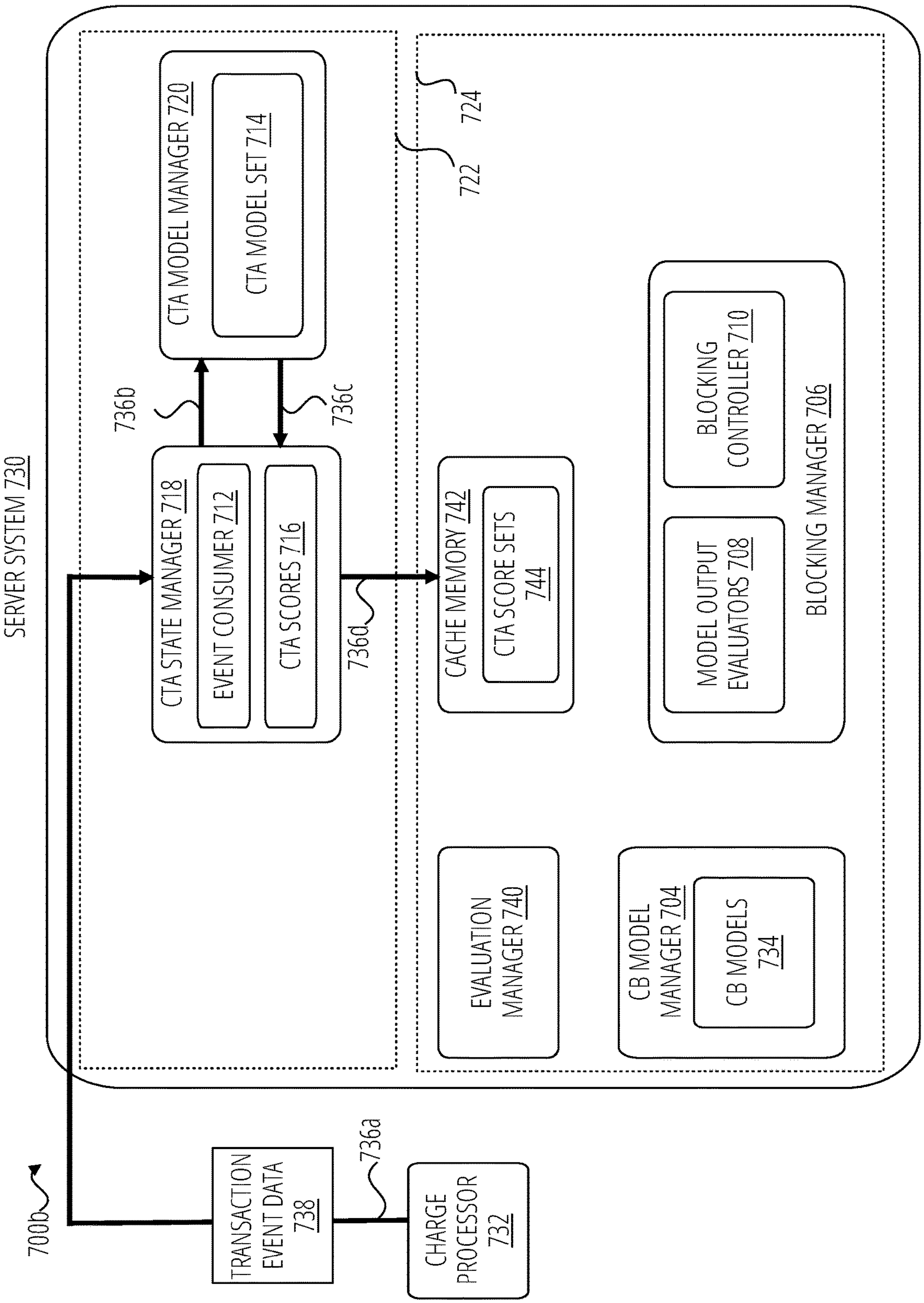

FIGS. 7A and 7B illustrate process flows for handling CTAs with a server system 730 according to some embodiments. More specifically, FIG. 7A illustrates a process flow 700*a* of server system 730 for making a blocking decision and FIG. 7B illustrates a process flow 700*b* for populating a memory with CTA scores according to some embodiments. The server system 730 is illustrated in conjunction with a charge processor 732 and includes CTA score determination components 722 and blocking determination components 724. The CTA score determination components 722 include a CTA state manager 718 with event consumer 712 and CTA scores 716 and a CTA model manager 720 including CTA model set 714. The blocking determination components 724 include evaluation manager 740, CB model manager 704 with CB models 734, cache memory 742 with CTA score sets 744, and blocking manager 706 with model output evaluators 708 and blocking controller 710. It will be appreciated that one or more components of FIGS. 7A and/or 7B may be the same or similar to one or more other components disclosed herein. For example, blocking manager 706 may be the same or similar to blocking manager 320. In another example, CTA state manager 718 may be the same or similar to CTA state manager 404. In yet another example, cache memory 742 may be the same or similar to memory 314 or memory 406. Further, aspects discussed with respect to various components in FIGS. 7A and/or 7B may be implemented by one or more other components from one or more other embodiments without departing from the scope of this disclosure. For example, cache memory 742 may be included in CTA score determination components 722 without departing from the scope of this disclosure. Embodiments are not limited in this context.

Referring to FIG. 7A, process flow 700*a* includes operations of the server system 730 that occur as part of a charge path and/or a CTA score retrieval path utilized by the server system 730 to determine whether or not to block a transaction. A portion of the charge path including CP segments 726*a*, 726*b*, 726*c*, 726*d*, 726*e* and the score retrieval path 726 including a plurality of CTA score retrieval segments 728*a*, 728*b* are illustrated in FIG. 7A. In many embodiments, operations in the charge path may be minimized to the extent possible to minimize latency of the charge path. Minimized latency in the charge path can enable quicker and more responsive charge processing services, leading to an improved merchant and customer experience.

Generally, the process flow 700*a* may begin with CP segment 726*a* in which evaluation manager 740 receives a request from charge processor 732 to evaluate a transaction as part of a charge path that processes at least a portion of the transaction. The request may include transaction data 702 associated with the transaction. The transaction data 702 may include any data associated with or corresponding to the transaction that may be utilized to characterize or evaluate the transaction for fraud analysis. For example, transaction data 702 may include one or more of card information, transaction identifier, merchant identifier, bin identifier, an IP address, a country of origin, number of associated transactions, and the like.

In response to the request, evaluation manager 740 may provide one or more portions of the transaction data 702 to CB model manager 704 for generating blocking scores at CP segment 726*b*. The blocking scores may be generated by CB models 734 of the CB model manager 704 and then provided to the blocking manager 706 at CP segment 726*c*. Additionally, in response to the request from charge processor 732, evaluation manager 740 may utilize one or more portions of the transaction data 702 (e.g., a merchant identifier or a bin identifier) to query cache memory 742 for relevant CTA score sets 744 at CTA score retrieval segment 728*a*. In various embodiments, the cache memory 742 may be queried by the evaluation manager 740 using an application programming interface (API) call. If relevant CTA score sets 744 are located in the cache memory 742, they may be provided to the blocking manager 706 at CTA score retrieval segment 728*b*.

The model output evaluators 708 of the blocking manager 706 may determine whether to adjust the current blocking score thresholds. For example, if the CTA score sets 744 indicate that a CTA is occurring, then the blocking score thresholds may be lowered from the default blocking score thresholds, resulting in transactions that would have been allowed under the default blocking score thresholds being blocked. In another example, if the CTA score sets 744 indicates that a CTA is not occurring, then the blocking score thresholds may be left at default levels or returned to default levels from adjusted blocking score thresholds.

In some embodiments, the blocking score thresholds may be selected based on the CTA score sets 744. For example, if the CTA score sets 744 are indicative of a CTA occurring with a high confidence level, then the blocking score thresholds may be set to a lower level than if the CTA score sets 744 are indicative of a CTA occurring with a low level of confidence. In other embodiments, the confidence level may be determined based on the CTA scores themselves. For example, the higher the CTA scores, the lower the CTA score thresholds are adjusted. In some embodiments, the confidence level may be provided as a separate parameter than the CTA scores themselves. These and other capabilities can facilitate an improved and more capable system for adapting to and blocking attacks.

In various embodiments, the blocking manager 706 may return adjusted blocking score thresholds to the default level after a threshold period of time. For example, the threshold period of time may be between 0.5 and 2 minutes, such as 0.8, 1, or 1.2 minutes. In some embodiments, the threshold period of time may be selected based on the CTA score sets 744. For example, if the CTA score sets 744 are indicative of a CTA attack occurring with a high confidence level (e.g., >90%), then the threshold period of time may be set to 2 minutes. However, if the CTA score sets 744 are indicative of a CTA attack occurring with a low confidence level (e.g., 50%), then the threshold period of time may be set to 0.8 minutes.

Implementing thresholds in this manner allows for thresholds to be dynamically adjusted based on characteristics of one or more transactions. In this manner, thresholds can be adjusted based on detection of certain behaviors, such as detected fraudulent activity (e.g., a CTA), and optionally, be adjusted in response to subsequent detection of certain behaviors, such as no detected fraudulent activity over a threshold period of time. Accordingly, thresholds are adjusted as needed and/or returned to a default value, providing for efficient, adaptive behavior during operation in which higher (or lower) thresholds are applied as needed.

The model output evaluators 708 may provide an indication to the blocking controller 710 on whether or not to block the transaction based on the output of the model output evaluators 708. For example, the model output evaluators 708 may compare the CB scores to the blocking score thresholds and provide an indication to the blocking controller 710 on whether or not to block the transaction. The blocking decision may then be returned to the evaluation manager 740 at CP segment 726*d* and the evaluation manager 740 may return the blocking decision to the charge processor 732 at CP segment 726*e*. In some embodiments, the blocking manager 706 may provide the blocking decision directly to the charge processor 732.

Referring to FIG. 7B, process flow 700*b* includes operations of server system 730 that occur as part of a CTA scoring path 734 utilized by the server system 730 to populate cache memory 742 with CTA score sets 744. In the illustrated embodiment, CTA scoring path 734 includes a plurality of CTA scoring path segments 736*a*, 736*b*, 736*c*, 736*d*.

Generally, the process flow 700*b* with CTA scoring path segment 736*a* in which charge processor 732 emits transaction event data 738 to CTA state manager 718. For example, in response to processing a transaction, or at least a portion of the transaction, the charge processor 732 may generate an event including the transaction event data 738. The transaction event data 738 may be emitted by the charge processor 732 asynchronously with the charge path. In other words, the transaction event data 738 may be sent to the CTA model manager 720 outside of the charge path. Advantageously, this can minimize latency of the charge path by not adding event generation operations to the charge path. In some embodiments, a plurality of events may be emitted by the charge processor 732.

The transaction event data 738 may be received by one or more of the event consumer 712 in the CTA state manager 718. As previously mentioned, the CTA state manager 718 may include a different event consumer for each set of CTA models (see e.g., FIG. 4). However, with respect to process flow 700*b*, only a single event consumer 712 and a single CTA model set 714 is illustrated and described. In response to receiving the transaction event data 738, the event consumer 712 may determine whether or not new scores have been generated by the corresponding set of CTA models within a threshold amount of time. In response to determining new scores have not been generated within the threshold amount of time, the event consumer 712 may provide one or more portion of the transaction event data 738 to the CTA model manager 720 for scoring at CTA scoring path segment 736*b*. The CTA model manager 720 may utilize the CTA model set 714 to score the data. In various embodiments, one or more components of the CTA state manager 718 and/or CTA model manager 720 may condition the transaction event data 738 for being provided to the CTA models as input. For example, event consumer 712 or CTA model manager 720 may generate a feature set with values based on the transaction event data 738.

The CTA scores 716 generated by the CTA model set 714 may be provided to the CTA state manager 718 at CTA scoring path segment 736*c*. The CTA state manager 718 may then store the CTA scores 716 in cache memory 742 as CTA score sets 744 at CTA scoring path segment 736*d*. In some embodiments, the CTA state manager 718 may generate and associate a time stamp with the CTA scores 716 and store the CTA scores 716 along with the time stamp in cache memory 742 as CTA score sets 744. In one embodiment, the cache memory 742 may be configured to discard any score sets that are older than a threshold amount of time.

FIG. 8 illustrates a logic flow 800 of a method for CTA handling according to some embodiments. The logic flow 800 is performed by processing logic that may comprise hardware (circuitry, dedicated logic, etc.), software (such as is run on a general purpose computer system or a dedicated machine), firmware, or a combination. In various embodiments, the logic flow 800 is performed by one or more of a commerce platform system (e.g., commerce platform system 104), a server system (e.g., server system 300, server system 400, or server system 730), CTA score determination components (e.g., CTA score determination components 112 or CTA score determination components 206), and charge blocking determination components (e.g., charge blocking determination components 114 or charge blocking determination components 204). Embodiments are not limited in this context.

Referring to FIG. 8, the logic flow 800 begins at block 802. At block 802, a request to evaluate a transaction as part of a charge path corresponding to the transaction may be received by a server system. The request may include transaction data associated with the transaction. For example, evaluation manager 740 of server system 730 may receive a request to evaluate a transaction as part of charge path 726. Continuing to block 804, a portion of the transaction data may be processed by a set of blocking machine learning models of the server system to generate a set of blocking scores for the transaction. For example, CB models 734 of CB model manager 704 in server system 730 may process a portion of the event data to generate a set of blocking scores for the transaction.

Proceeding to block 806, a set of CTA scores associated with the transaction may be retrieved by the server system from a memory. The set of CTA scores may be indicative of an occurrence of a CTA and the set of CTA scores may be retrieved based on the transaction data. For example, CTA score set 316 associated with the transaction may be retrieved from memory 314 by server system 300. Further the CTA score set 316 may be indicative of occurrence of a CTA and the CTA score set 316 may be retrieved based on at least a portion of transaction data 304, such as a merchant identifier. The ability to retrieve CTA scores that are indicative of an occurrence of a CTA is a technical advantage and improves the functioning of a computer, for example, by enabling efficient and low-latency determinations of whether a CTA is occurring without adding operationally costly operations to the charge path, such as the determination of the CTA scores.

At block 808, a set of default blocking scores may be adjusted by the server system based on the set of CTA scores to generate a set of adjusted blocking score thresholds. For example, blocking manager 320 of server system 300 may adjust a set of default blocking scores based on CTA score set 316 to generate a set of adjusted blocking score thresholds. The ability to adjust blocking score thresholds provides technical advantages and improves the functioning of a computer, for example, by enabling reliable detection CTAs without excessive false positives.

Continuing to block 810, the set of blocking scores may be compared by the server system with the set of adjusted blocking score thresholds. For example, blocking manager 320 of server system 300 may compare the score 312*a* to the adjusted blocking score thresholds. At block 812, the server system may determine to allow the transaction based on comparison of the set of blocking scores with the set of adjusted blocking score thresholds. For example, blocking manager 320 of server system 300 may determine to allow the transaction associated with transaction data 304 based on comparison of the set of blocking scores with the set of adjusted blocking score thresholds.

Selectively blocking transactions in the described manner allows for scores to be retrieved, adjusted, and/or compared without requiring unduly additional computation and/or introducing latency in the charge path of a transaction. This in turn provides improved efficiency and reliability with respect to the management of transactions.

In some examples, the set of CTA scores are generated by a set of CTA ML models outside of the charge path that processes at least the portion of the transaction. Generating CTA scores using a set of ML models outside of a charge path that processes at least a portion of a transaction allows for such scores to be generated without adding latency in the charge path of a transaction. As a result, transactions can be processed more efficiently and reliably than transaction processing in which scores are generated as part of a serial workflow for the transaction.

In some examples, the set of blocking scores for the transaction are generated by the set of blocking ML models as part of the charge path that processes at least the portion of the transaction.

In some examples, the transaction comprises a current transaction and the set of CTA scores are generated by a set of CTA ML models based on data associated with a previous transaction. Leveraging data associated with previous transactions allows for scores to be quickly and reliably accessed by ML models, which in turn allows for more efficient and adaptive operation, for instance, when analyzing and/or selectively blocking transactions. The models may, for instance, generate scores independently from a current transaction, allowing for more predictive operation that does not rely on (or solely rely on) behavior and/or characteristics of a current transaction.

In some examples, the current transaction and the previous transaction are associated with a common identifier.

In some examples, the common identifier corresponds to a common merchant or bin.

In some examples, each CTA score in the set of CTA scores is generated by a different CTA model that is trained to detect a different attack pattern indicative of CTAs. Using multiple models to generate scores for various activities and behaviors in this manner allows for more accurate detection of security events, such as fraudulent activity, which in turn provides more efficient and reliable operation.

In some examples, the set of CTA scores include a first set of CTA scores. In some examples, the server system receives event data associated with the transaction. In some examples, a set of CTA ML models of the server system process a feature set produced based on the event data to generate a second set of CTA scores. In some examples, the second set of CTA scores is stored in the memory.

In some examples, the second set of CTA scores are generated and stored in the memory in response to a determination that the first set of CTA scores are older than a threshold amount of time. Generating a second set of scores in response to determining that a previous set is aged by at least a threshold amount of time ensures that fresh scores are used in operation, without requiring that scores are generated for every transaction. Because reducing the number of iterations of generating scores reduces computational load, this manner of generating scores provides for more efficient operation without sacrificing reliance on up-to-date scores.

In some examples, the server system automatically reverts from using the set of adjusted blocking score thresholds to using the set of default blocking score thresholds for comparisons after a threshold amount of time.

Figure 9:
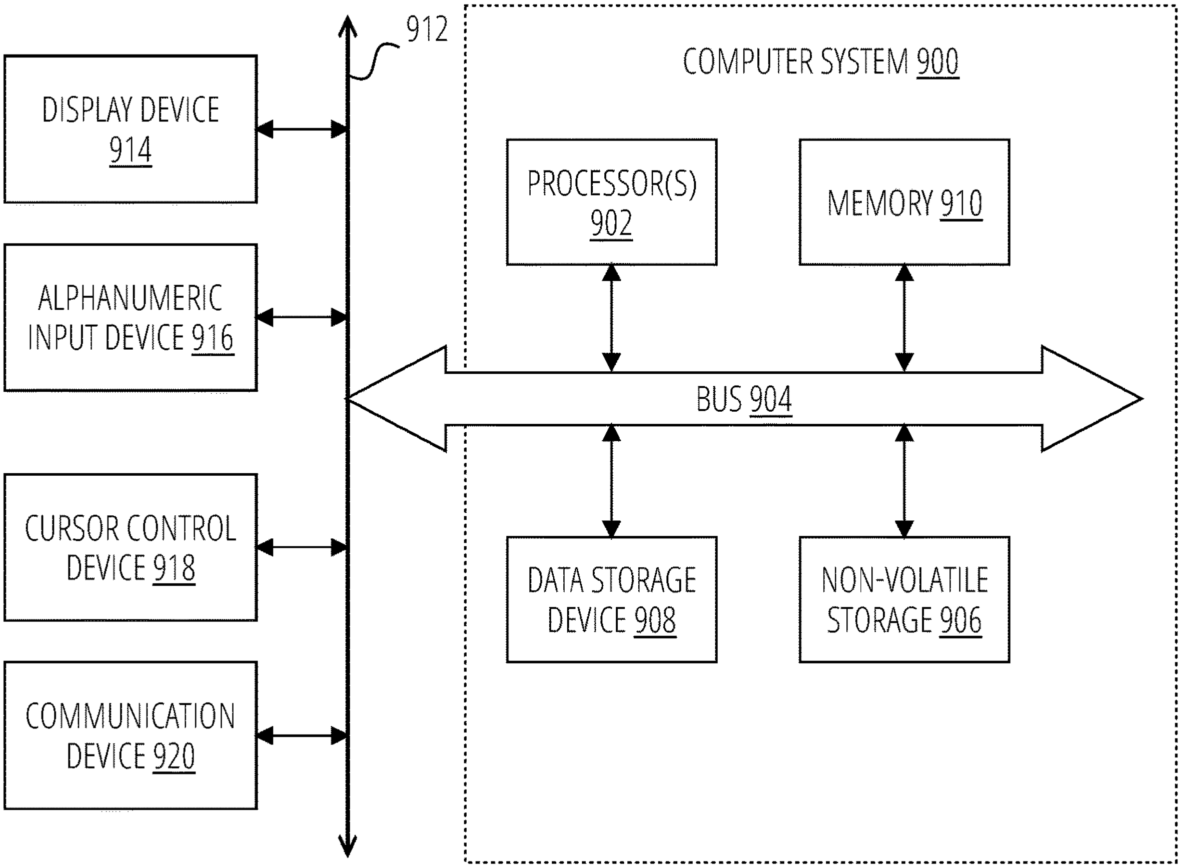
FIG. 9 is one embodiment of a computer system that may be used to support the systems and operations discussed herein.

FIG. 9 is one embodiment of a computer system that may be used to support the systems and operations discussed herein. For example, the computer system illustrated in FIG. 9 may be used by a commerce platform system, a merchant development system, user system, etc. It will be apparent to those of ordinary skill in the art, however that other alternative systems of various system architectures may also be used.

The data processing system illustrated in FIG. 9 includes a bus or other internal communication means 904 for communicating information, and one or more processors 902 coupled to the bus 904 for processing information. The system further comprises a random access memory (RAM) or other volatile storage device (referred to as memory 910), coupled to bus 904 for storing information and instructions to be executed by processor 902. Memory 910 (e.g., main memory) also may be used for storing temporary variables or other intermediate information during execution of instructions by processor 902. The system also comprises non-volatile storage 906 (e.g., read only memory (ROM) and/or static storage device) coupled to bus 904 for storing static information and instructions for processor 902, and a data storage device 908 such as a magnetic disk or optical disk and its corresponding disk drive. Data storage device 908 is coupled to bus 904 for storing information and instructions.

The system may further be coupled to a display device 914, such as a light emitting diode (LED) display or a liquid crystal display (LCD) coupled to bus 904 through bus 912 for displaying information to a computer user. An alphanumeric input device 916, including alphanumeric and other keys, may also be coupled to bus 904 through bus 912 for communicating information and command selections to processor 902. An additional user input device is cursor control device 918, such as a touchpad, mouse, a trackball, stylus, or cursor direction keys coupled to bus 904 through bus 912 for communicating direction information and command selections to processor 902, and for controlling cursor movement on display device 914.

Another device, which may optionally be coupled to computer system 900, is a communication device 920 for accessing other nodes of a distributed system via a network. The communication device 920 may include any of a number of commercially available networking peripheral devices such as those used for coupling to an Ethernet, token ring, Internet, or wide area network. The communication device 920 may further be a null-modem connection, or any other mechanism that provides connectivity between the computer system 900 and the outside world. Note that any or all of the components of this system illustrated in FIG. 9 and associated hardware may be used in various embodiments as discussed herein.

It will be appreciated by those of ordinary skill in the art that any configuration of the system may be used for various purposes according to the particular implementation. The control logic or software implementing the described embodiments can be stored in memory 910 (e.g., main memory), data storage device 908 (e.g., mass storage device), non-volatile storage 906 (e.g., ROM), or other storage medium locally or remotely accessible to processor 902.

It will be apparent to those of ordinary skill in the art that the system, method, and process described herein can be implemented as software stored in memory 910, non-volatile storage 906, and/or data storage device 908 and executed by processor 902. This control logic or software may also be resident on an article of manufacture comprising a computer readable medium having computer readable program code embodied therein and being readable by the data storage device 908 and for causing the processor 902 to operate in accordance with the methods and teachings herein.

The embodiments discussed herein may also be embodied in a handheld or portable device containing a subset of the computer hardware components described above. For example, the handheld device may be configured to contain only the bus 904, the processor 902, and memory 910 and/or non-volatile storage 906. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 902, a data storage device 908, a bus 904, and memory 910, and only rudimentary communications mechanisms, such as a small touch-screen that permits the user to communicate in a basic manner with the device. In general, the more special-purpose the device is, the fewer of the elements need be present for the device to function.

There are a number of example embodiments described herein.

Example 1 is a computer-implemented method for handling card testing attacks. The method can include receiving, by a server system, a request to evaluate a transaction as part of a charge path that processes at least a portion of the transaction, wherein the request includes transaction data associated with the transaction; processing, by a set of blocking machine learning (ML) models of the server system, a portion of the transaction data to generate a set of blocking scores for the transaction; retrieving, by the server system from a memory, a set of card testing attack (CTA) scores associated with the transaction, the set of CTA scores indicative of an occurrence of a card testing attack, and the set of CTA scores retrieved based on the transaction data; adjusting, by the server system, a set of default blocking score thresholds based on the set of CTA scores to generate a set of adjusted blocking score thresholds; comparing, by the server system, the set of blocking scores with the set of adjusted blocking score thresholds; and determining, by the server system, to allow the transaction based on comparison of the set of blocking scores with the set of adjusted blocking score thresholds.

Example 2 is a computer-implemented method of Example 1 that may optionally include the set of CTA scores are generated by a set of CTA ML models outside of the charge path that processes at least the portion of the transaction.

Example 3 is a computer-implemented method of Example 1 or 2, that may optionally include the set of blocking scores for the transaction are generated by the set of blocking ML models as part of the charge path that processes at least the portion of the transaction.

Example 4 is a computer-implemented method of any combination of Examples 1-3, that may optionally include the transaction comprises a current transaction and the set of CTA scores are generated by a set of CTA ML models based on data associated with a previous transaction.

Example 5 is a computer-implemented method of Example 4, that may optionally include the current transaction and the previous transaction are associated with a common identifier.

Example 6 is a computer-implemented method of any combination of Examples 1-5, that may optionally include that each CTA score in the set of CTA scores is generated by a different CTA model that is trained to detect a different attack pattern indicative of CTAs.

Example 7 is a computer-implemented method of any of Examples 1-6, that may optionally include the set of CTA scores include a first set of CTA scores, and the method further comprising: receiving, by the server system, event data associated with the transaction; processing, by a set of CTA ML models of the server system, a feature set produced based on the event data to generate a second set of CTA scores; and storing the second set of CTA scores in the memory.

Example 8 is a computer-implemented method of Example 7, that may optionally include the second set of CTA scores are generated and stored in the memory in response to a determination that the first set of CTA scores are older than a threshold amount of time.

Example 9 is a computer-implemented method of any combination of Examples 1-8, that may optionally include the server system automatically reverts from using the set of adjusted blocking score thresholds to using the set of default blocking score thresholds for comparisons after a threshold amount of time.

Example 10 is a non-transitory computer readable storage medium including instructions that, when executed by a processor, cause the processor to perform operations for handling card testing attacks according to any combination of Examples 1-9.

Example 11 is a server computer system for handling card testing attacks, comprising: a memory; and a processor coupled to the memory configured to perform operations for handling card testing attacks according to any combination of Examples 1-9.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purposes of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

What is claimed is:

1. A computer-implemented method for handling card testing attacks, the method comprising:

receiving, by a server system, a request to evaluate an event as part of a path that processes at least a portion of the event, wherein the request includes event data associated with the event comprising an identifier of a second server system that generated the event;

invoking a set of blocking machine learning (ML) models to process a portion of the event data and to generate a set of blocking scores for the event;

detecting a cache hit for a set of card testing attack (CTA) scores generated asynchronously to the path and associated with the identifier of the second server system, the set of CTA scores being generated by a plurality of ML models operating in parallel; and subsequent to detecting the cache hit, reconfiguring the server system to selectively block the event by:

retrieving, from a memory, the set of CTA scores based on the event data;

determining whether to adjust a set of default blocking score thresholds based on whether the set of CTA scores is indicative of an occurrence of a card testing attack at the second server system; and in accordance with a determination to adjust the set of default blocking score thresholds, generating a set of lowered blocking score thresholds by lowering the set of default blocking score thresholds for a threshold amount of time;

blocking the event in response to determining that at least one blocking score of the set of blocking scores exceeds a blocking score threshold from the set of lowered blocking score thresholds; and resetting the set of default blocking score thresholds after the threshold amount of time.

2. The computer-implemented method of claim 1, wherein the set of CTA scores is generated by a set of CTA ML models outside of the path that processes at least the portion of the event.

3. The computer-implemented method of claim 1, wherein the set of blocking scores for the event is generated by the set of blocking ML models as part of the path that processes at least the portion of the event.

4. The computer-implemented method of claim 1, wherein the event comprises a current event and the set of CTA scores is generated by a set of CTA ML models based on data associated with a previous event.

5. The computer-implemented method of claim 4, wherein the current event and the previous event are associated with a common identifier.

6. The computer-implemented method of claim 1, wherein each CTA score in the set of CTA scores is generated by a different CTA model that is trained to detect a different attack pattern indicative of CTAs.

7. The computer-implemented method of claim 1, wherein the set of CTA scores include a first set of CTA scores, and the method further comprises:

receiving, by the server system, further event data associated with the event;

processing, by a set of CTA ML models of the server system, a feature set produced based on the further event data to generate a second set of CTA scores; and storing the second set of CTA scores in the memory.

8. The computer-implemented method of claim 7, wherein the second set of CTA scores are generated and stored in the memory in response to a determination that the first set of CTA scores are older than a further threshold amount of time.

9. A non-transitory computer readable storage medium including instructions that, when executed by a processor, cause the processor to perform operations for handling card testing attacks, the operations comprising:

receiving, by a server system, a request to evaluate an event as part of a path that processes at least a portion of the event, wherein the request includes event data associated with the event comprising an identifier of a second server system that generated the event;

invoking a set of blocking machine learning (ML) models, to process a portion of the event data and to generate a set of blocking scores for the event;

detecting a cache hit for a set of card testing attack (CTA) scores generated asynchronously to the path and associated with the identifier of the second server system, the set of CTA scores being generated by a plurality of ML models operating in parallel; and subsequent to detecting the cache hit, reconfiguring the server system to selectively block the event by:

retrieving, from a memory, the set of CTA scores based on the event data;

determining whether to adjust a set of default blocking score thresholds based on whether the set of CTA scores is indicative of an occurrence of a card testing attack at the second server system; and in accordance with a determination to adjust the set of default blocking score thresholds, generating a set of lowered blocking score thresholds by lowering the set of default blocking score thresholds for a threshold amount of time;

blocking the event in response to determining that at least one blocking score of the set of blocking scores exceeds a blocking score threshold from the set of lowered blocking score thresholds; and resetting the set of default blocking score thresholds after the threshold amount of time.

10. The non-transitory computer readable storage medium of claim 9, wherein the set of CTA scores is generated by a set of CTA ML models outside of the path that processes at least the portion of the event.

11. The non-transitory computer readable storage medium of claim 9, wherein the set of blocking scores for the event is generated by the set of blocking ML models as part of the path that processes at least the portion of the event.

12. The non-transitory computer readable storage medium of claim 9, wherein the event comprises a current event and the set of CTA scores is generated by a set of CTA ML models based on data associated with a previous event.

13. The non-transitory computer readable storage medium of claim 9, wherein the set of CTA scores include a first set of CTA scores, and the operations further comprise:

receiving, by the server system, further event data associated with the event;

processing, by a set of CTA ML models of the server system, a feature set produced based on the further event data to generate a second set of CTA scores; and storing the second set of CTA scores in the memory.

14. A server computer system for handling card testing attacks, comprising:

a memory; and a processor coupled to the memory configured to:

receive a request to evaluate an event as part of a path that processes at least a portion of the event, wherein the request includes event data associated with the event comprising an identifier of a second server system that generated the event;

invoke a set of blocking machine learning (ML) models of the server computer system to process a portion of the event data and to generate a set of blocking scores for the event;

detect a cache hit for a set of card testing attack (CTA) scores generated asynchronously to the path and associated with the identifier of the second server system, the set of CTA scores being generated by a plurality of ML models operating in parallel; and subsequent to detecting the cache hit, reconfigure the server computer system to selectively block the event by:

retrieving, from a memory, the set of CTA scores based on the event data;

determining whether to adjust a set of default blocking score thresholds based on whether the set of CTA scores is indicative of an occurrence of a card testing attack at the second server system; and in accordance with a determination to adjust the set of default blocking score thresholds, generating a set of lowered blocking score thresholds by lowering the set of default blocking score thresholds for a threshold amount of time to generate a set of lowered blocking score thresholds, blocking the event in response to determining that at least one blocking score of the set of blocking scores exceeds a blocking score threshold from the set of lowered blocking score thresholds; and resetting the set of default blocking score thresholds after the threshold amount of time.

15. The server computer system of claim 14, wherein the set of CTA scores is generated by a set of CTA ML models outside of the path that processes at least the portion of the event.

16. The server computer system of claim 14, wherein the set of blocking scores for the event is generated by the set of blocking ML models as part of the path that processes at least the portion of the event.

17. The server computer system of claim 14, wherein the event comprises a current event and the set of CTA scores is generated by a set of CTA ML models based on data associated with a previous event.

18. The server computer system of claim 14, wherein each CTA score in the set of CTA scores is generated by a different CTA model that is trained to detect a different attack pattern indicative of CTAs.

19. The server computer system of claim 14, wherein the set of CTA scores include a first set of CTA scores, and the processor coupled to the memory is further configured to:

receive further event data associated with the event;

process, by a set of CTA ML models, a feature set produced based on the further event data to generate a second set of CTA scores; and store the second set of CTA scores in the memory.

* * * * *